United States Patent Office 2,774,692
Patented Dec. 18, 1956

2,774,692
COATED FIBROUS PRODUCTS AND METHODS OF MAKING THEM

James P. Shelley, Drexel Hill, and Earl M. Young, Jr., Philadelphia, Pa., assignors to Rohm & Haas Company, Philadelphia, Pa., a corporation of Delaware No Drawing. Application June 16, 1954, Serial No. 437,269

13 Claims. (Cl. 117—155)

This invention relates to novel and improved coated fibrous paper-like products and to methods of making them.

It is an object of the present invention to provide a new method for coating paper products using essentially aqueous compositions which are adapted to cure to final insoluble condition at a temperature from room temperature to 350° F. A further object is to provide a method for producing coated paper products which involves the application of an aqueous composition adapted to be insolubilized very quickly such as in a period of one minute or less at temperatures of about 250° C. so that the paper substrate is undamaged by the process. Another object is to provide a process for producing a high gloss coated paper or like fibrous product using water-soluble resin-forming condensates so that the equipment employed for applying the coating can be washed with water. Another important object is to provide coated paper products having outstanding properties including high gloss, water-resistance, grease-resistance, resistance to organic plasticizers or the like. Other objects and advantages will be apparent from the description thereof hereinafter.

In accordance with the present invention, the improved coated paper products are obtained by the application of an aqueous solution or dispersion containing 5 to 70% of a condensation product of formaldehyde with diethylene glycol dicarbamate having the formula

with or without methanol. The novel condensation products that can be employed in accordance with the present invention are described and claimed in the copending application Serial No. 437,268 of Shelley, filed on even date herewith.

As disclosed in the aforementioned copending application, the condensate is produced by reacting formaldehyde with the dicarbamate of diethylene glycol in an aqueous medium at a pH of 2.3 to 3.5. The concentration of the formaldehyde and bis-carbamate in the initial reaction medium should be between 50% and 85% by weight of the total weight of the reaction medium. The molar ratio between the formaldehyde and the bis-carbamate in the reaction medium at the start of the reaction must be between 2:1 and 3.5:1. The preferred mole ratio of formaldehyde to bis-carbamate is between 2.5 and 3 moles of formaldehyde to one of the carbamate. The temperature may vary from 70° to the boiling point of the reaction medium which may be as high as 105–110° C. at normal atmospheric pressure, or higher when the reaction is carried out under pressures above normal atmospheric pressure or in the presence of other solvents which are inert to the reaction, for example, dimethylformamide.

Under the conditions just outlined, the reaction is carried out until the condensation product has a viscosity, as determined in a solution in water of a 60% "solids" concentration at 25° C., of at least 2 poises but not over 25 poises. Preferably the condensate when tested under these conditions has a viscosity between 6 and 20 poises. The "solids" referred to is determined by diluting a sample of the aqueous condensate with an equal weight of water, weighing the residue of a portion (0.6 to 0.8 gram) after heating 90 minutes at 125° C. to determine the percentage of solids in said portion and multiplying by a factor of 2 to compensate for the dilution. The time required to attain the required viscosity depends upon the several conditions of pH, concentration, temperature and ratio of formaldehyde to bis-carbamate within the ranges set out above. Depending upon the several conditions just stated, the desired molecular weight of the condensation may be attained within a period of from ten minutes to eight hours or more reaction time.

The condensation may also take place in the presence of methyl alcohol which is believed to combine with the reactants to form methylated derivatives. The proportion of methyl alcohol when used may be from 1 to 2.5 moles per mole of bis-carbamate and is preferably from 1.5 to 2 moles per mole of bis-carbamate. When the condensation is effected in the presence of methyl alcohol, it is preferred to carry out the reaction in the lower portion of the pH range, that is from 2.3 to about 2.8. When the condensation is effected in water in the absence of methyl alcohol, the preferred pH is within the range of 2.5 to 3. Ethanol or higher alcohols cannot be used since condensates with them have practically no water-compatibility or are completely water-insoluble, have poor film-forming quality unless they are dissolved in organic solvents, and washing or cleaning of equipment used for making or applying them would require the use of organic solvents.

The temperature of the reaction medium is preferably that which corresponds to the reflux or boiling temperature generally lower when methyl alcohol is present than when the reaction medium is simply water. The preferred temperature when water alone is used as the solvent medium is from 90 to 100° C., but as pointed out hereinabove, higher temperatures may be employed when superatmospheric pressure is employed, whether the reaction medium contains methyl alcohol or not.

The concentration when methyl alcohol is present may vary from 50% to 85%. When no methyl alcohol is present, the concentration of formaldehyde and bis-carbamate within the aqueous medium is from 50% to 75% and is preferably between 60% to 70%.

After the reaction has been effected to the viscosity within the range specified hereinabove, the reaction medium or mass is cooled to 30° C. or lower. Preferably the cooled mass is then neutralized by the addition of a suitable alkaline material such as a soluble oxide, hydroxide or carbonate, and preferably with the hydroxide of ammonium or an alkali metal such as sodium or potassium. After neutralization with sodium or potassium hydroxide, the reaction mass still shows infinite water tolerance. When neutralized with ammonium hydroxide, however, those reaction masses, in which the higher viscosity is attained within the range specified, sometimes have less than infinite water tolerance, but in all cases the composition will stand a considerable amount of water. Generally, 10 grams of a reaction mass containing 50% resin solids and neutralized with ammonium hydroxide can be diluted from 30 to 70 cc. of water at normal room temperature without forming distinct layers. However, even in those cases where neutralization reduces the water-compatibility or tolerance, the material recovers infinite tolerance to water upon re-acidification.

The reaction between the bis-carbamate and formaldehyde may be carried out generally as follows: The bis-carbamate is introduced into aqueous 37% formaldehyde producing various concentrations depending upon the ratio of formaldehyde to the carbamate, the initial concentration being about 64% when the mole ratio of formaldehyde to carbamate is 3.0:1. The dispersion on heating becomes a clear solution and it is preferred to strip water by distillation to bring the concentration to about 60% reaction product at which time sulfuric acid or other catalysts are added to reduce the pH to a value from 2.3 to 3.5, preferably from 2.3 to 3.5, preferably from 2.3 to 2.8 if methanol is present or from 2.5 to 3.0 if methanol is absent. At this point, the viscosity of the reaction medium is generally about ½ to 1 poise (at 65% concentration). It should be understood that the acid may be added before stripping, but this is not preferred. The reaction mass is heated to condense the formaldehyde bis-carbamate reaction product to a viscosity of at least 2 poises at 60% concentration in water at 25° C. The reaction mass at this time has infinite water tolerance and retains it on partial or complete neutralization with sodium hydroxide or potassium hydroxide to a pH of 5 to 7.5. The resulting reaction mass may have a concentration of the condensate of 50% or more and it may be used directly for coating or film-forming purposes. When so used reasonably promptly, neutralization may be omitted. Thus the unneutralized condensate formed without methanol can be used within about 12 to 24 hours whereas those formed with methanol can be used within one week to several months depending on the degree of condensation, without encountering troublesome gelling.

If reasonably prompt use is not desired, the reaction mass should be treated with an alkaline material to raise the pH to a value of 5 to 7, preferably 6.0 to 6.5. It is preferred to avoid raising the pH above 6.5 because of the tendency for too much salt to be formed so that the salt tends to crystallize out of the reaction mass on standing. The partially or completely neutralized reaction mass may be stored definitely without dilution and transported to the point of application where an acid catalyst may be introduced just before it is applied for the formation of coatings or films. A strong acid catalyst such as sulfuric acid, toluenesulfonic acids, ethanesulfonic acid, ammonium phosphate, ammonium thiocyanate, hydrochloric or other acid salts of a hydroxy aliphatic amine including 2-methyl-2-amino-1-propanol, 2-methyl-2-amino-1,3-propandiol, tris(hydroxy-methyl)-amino-methane, 2-phenyl-2-amino-1-propanol, 2-methyl-2-amino-1-pentanol, 2-aminobutanol, triethanolamine, 2-amino-2-ethyl-1-butanol, ammonium chloride, pyridine hydrochloride, and benzyldimethylamine oxalate may be used. The amine salts are water-soluble latent catalysts substantially neutral at ordinary temperature which dissociate into volatile components one of which is acidic at the elevated temperatures used for baking and curing, so that the catalyst after exerting its accelerating effect is automatically discharged from the mass during the heating stage. The amount of catalyst used may be from 1 to 6% or more by weight based on the weight of condensate solids.

Because of the water-compatibility of the reaction mass, it may be diluted to any desired extent before application merely by the addition of water.

For most practical purposes, concentrations from 5 to 70% of condensate solids may be employed depending on the thickness of coating desired and the type of equipment used for applying it. The composition may be applied in any suitable manner, such as by a knife coater or by dipping, roller coating, spraying, brushing, or the like. For spraying, dilution to a viscosity of 5 to 10 centipoises is generally most suitable.

Besides the introduction of an acid catalyst to accelerate the insolubilization of coatings, films or other products obtained from the condensate, various materials may be added for other purposes. For example, surface-active agents of anionic, non-ionic, or cationic type may be introduced to improve the flow and make the coating of film more uniform. Examples of non-ionic surface-active agents include polyethylene oxide derivatives of phenol, of alkyl phenols having 6 to 18 carbon atoms in the alkyl substituent, of higher fatty acids having from 8 to 18 carbon atoms, of higher fatty alcohols or mercaptans having from 8 to 18 carbon atoms, of long chain aliphatic amides having from 8 to 18 carbon atoms, of long chain fatty amines having from 8 to 18 carbon atoms, such derivatives containing from 10 to 50 or more oxyethylene units per melocule. Besides the non-ionic surface-active agents just mentioned, anionic types such as lauryl alcohol sulfate, sodium dioctyl sulfosuccinate, the sodium salt of isopropyl naphthalenesulfonic acid, or cationic agents such as lauryl pyridinium chloride may be employed. The proportion of surface-active agent may be from 0.01 to 3% of the weight of the condensate therein.

If desired, a volatile non-aqueous solvent may be added. Preferably, any such additional solvent is water-soluble, such as ethanol, propanol, isopropanol and t-butanol.

The coatings after insolubilization or curing by heating or by prolonged standing at room temperature show some tendency to swell in the presence of moisture. However, moisture does not loosen the coating from its substrate nor does it permanently damage the coating or coated paper, since on redrying the original properties are restored. A plasticizer that is compatible with the condensate may be included to increase its flexibility. Examples of such plasticizers are the monoalkyl ethers of ethylene glycol in which the alkyl group may be ethyl, methyl, propyl, isopropyl, or butyl. The monobutyl ether of diethylene glycol has the additional advantage, when used in proportions of 5 to 15% based on condensate solids, of reducing the tendency of the final coating to swell in the presence of moisture.

Besides catalyst, surface-active agent, and/or other solvent, the composition may also comprise other materials such as other thermosetting resin-forming materials such as phenol-aldehyde condensates, aminoplasts such as melamine formaldehyde condensates, urea-formaldehyde condensates and the like, alkyds, especially the drying oil-modified alkyds, and vinyl or acrylic resins, such as polyvinyl acetate, and copolymers of 80 to 95% vinyl acetate with ethyl acrylate or methyl methacrylate. The coating composition may contain from 10% to 90% of the formaldehyde carbamate condensate and from 90% to 10% respectively of the other resin-forming material based on the total resin-forming solids.

The coatings may be clear and colorless when formed without the addition of dyes or pigments, or they may be colored by the introduction of pigments or dyes, such as titanium oxide, lithopone, carbon black, ultramarine blue or the like.

After the films or coatings are formed from the aqueous condensate containing the catalysts with or without other materials, they are dried and cured to water-insoluble condition, preferably by heating at temperatures of about 180° F. to 350° F. or higher. Curing at 500° F. for very short periods of time, such as one second or less, may be used. The coatings on paper are preferably cured for 40 to 60 seconds at 250° F. to produce a final water-resistant grease-proof solvent-resistant flexible film having a clear gloss that is mar-resistant, non-tacky, resistant to blocking when stacked under 1.25 pounds per square inch pressure at 75% relative humidity up to 145° F., and resistant to heat-sealing, even when heated to a temperature as high as 210° F. Apparently the condensate reacts with the hydroxyl groups with the cellulose in the paper and cross-links the cellulose molecules.

The fibrous substrate to which the compositions are applied in carrying out the present invention include papers of all types, such as bond writing paper, fibrous paperboards such as cardboard, chipboard, carbon stock, and the like, wrapping papers or boards, or liners for containers intended for the packaging of foods, greases, chewing gum, soap, soap powders, cosmetics, calking compounds, etc. The coated papers may also be used as wall papers, papers for lining drawers and shelves, especially in linen closets, kitchen cabinets and so forth, and the coated paper or paperboards may be used as bookcovers or book pages. An amazing discovery is that the aqueous coating composition can be applied directly over hydrophobic inks, such as may be on decorated or printed papers or cardboards, particularly such as are used for postcards, book or magazine covers, advertising posters, wallpapers, shelfpapers and the like, without being repelled thereby and without smudging or showing any evidence of attack upon the printing or decorative matter. The composition may be applied to photographs or photostats to provide a clear glossy protective coating which is still highly receptive to printing and substantially stable to ultraviolet light. The coatings may be applied to building construction papers and boards, such as the facing paper on plasterboard. It may be used as a release coating on a paper to be used as a liner in a concrete molding form or adapted to be used for covering freshly-laid concrete roads.

The novel papers of the present invention may be used as a casting surface for the making of vinyl or asphalt tile, or for the deposition of an organosol for the production of plastic curtains, tablecloths, window curtains or drapes. The surface of the coating that serves as the casting surface for such organosols may carry an inked design or a relief pattern to be transferred to the shower curtain or the like that is cast thereon. The coated paper is adapted to receive transfer layers or coatings, such as a decorative decalcomania adapted to be released therefrom by moistening. The coatings of the present invention are substantially completely resistant to organic plasticizers and solvents of which a mixture of three volumes of tricresyl phosphate and one volume of a solvent naphtha such as Solvesso 150 is representative. Because of its resistance to plasticizers, such a coating may serve as a barrier layer to prevent the migration of a plasticizer such as tricresyl phosphate from a decorative plastic layer such as a cellulose ester like cellulose acetate or a vinyl resin like polyvinyl chloride or a nitrocellulose, to a fibrous substrate or paper layer. For this same purpose, the top surface of the plasticized decorative layer may also carry an outer coating of the formaldehyde dicarbamate condensate whether modified with methanol or not.

The coatings may have a thickness from 0.0001 inch to 0.05 inch or more.

For many of these purposes, the non-blocking and mar-resistant characteristics of the coated products are quite important. Similarly, the rapid curing characteristics of the coating composition is extremely important since it enables the coating composition to be applied to papers or paperboards during their production on machines for producing the paper or the like continuously. In the latter case, the composition may be applied to the continuously traveling sheet after it has been at least partially dried by passing alternately over the surfaces of drying drums in conventional fashion. Because of the rapid curing characteristics of the improved coating compositions of the present invention, they may be applied near the end of the normal drying stage in such a continuous paper manufacturing system, and setting or curing of the composition in the last portion of the dryer drum is easily effected without requiring any additional equipment for this purpose.

The method of the present invention has the advantage of not requiring special precautions to avoid the danger of fire or of toxic effects on the operators. It requires no equipment for solvent recovery, and water is all that is needed to wash off any residue on the equipment.

The following examples are illustrative of the present invention:

EXAMPLE 1

(a) *Preparation of condensate*

Diethylene glycol dicarbamate (480 grams or 2.5 moles) was charged to a one-liter flask containing 613.0 g. of aqueous 36.7% formaldehyde (7.5 moles HCHO). The mixture was heated with stirring to reflux (102° C.) and held at this temperature for 15 minutes in order to allow time for some reaction to take place between formaldehyde and the carbamate before starting to strip the batch. Then the heat was shut off while the apparatus was arranged for distillation (ca 10 mil.) after which heating was resumed and 63.0 g. of aqueous distillate was distilled from the reaction mixture (batch temp.=104° C. at this point). Heat was again shut off while the apparatus was arranged for total reflux (ca 15 min.). When heating was then resumed, the batch temperature was 90° C. and the pH of the batch was adjusted to 3.0 (G. E.) with 2.4 ml. of 50% aqueous $H_2SO_4$ and the batch (having about 60% solids content) was sampled for viscosity. The viscosity at this point was "A—" on the Gardner-Holdt scale at 25° C. or slightly less than ½ poise at 25° C. The batch was polymerized by heating at reflux until the viscosity on the Gardner-Holdt scale (at 25° C.) was "U+" (ca 7.0 poises at 25° C.). At this point heating was stopped and the batch was cooled. It was diluted with 150.0 g. of water to lower the solids content to about 50%. Then 9.2 g. of a polyethylene oxide derivative of octyl phenol containing an average of about 10 oxyethylene units per molecule was added and then 3.0 ml. of 50% aqueous NaOH solution was added, producing a pH of about 7 (Bromthymol Blue indicator).

(b) *Coating of fibrous base*

To the condensate thus obtained 6% (based on condensate solids) of p-toluenesulfonic acid was added. The resulting composition was applied to several sections of chipboard carrying a china clay-casein coating on one face as by roller application to the coated face and doctored by a wire-wound rod. The several sections were cured at 250° F., one for 40 seconds, another for 50 seconds, and a third for one minute. The several sections were resistant to heat-sealing up to temperatures of 210° F., had a high gloss, and were clear, moisture-resistant, and grease-resistant.

EXAMPLE 2

(a) *Preparation of condensate*

Diethylene glycol dicarbamate (768.0 grams or 4.0 moles) was charged to a 2-liter flask containing 752.0 g. of 40% HCHO solution in aqueous methanol containing 7% water (10.0 moles HCHO and 12.5 moles methanol) and heat and stirring were applied. At 70° C., 37.0 ml. of syrupy (85%) phosphoric acid was charged to the batch (pH about 2.7) and heating was continued to boiling (ca 91° C.). Then 255.0 g. of alcoholic distillate was distilled from the batch to leave a methanol-diethylene glycol carbamate ratio of 1.5:1 after which cooling was applied and 110.0 g. of water was charged to the batch. The apparatus was arranged for total reflux and the batch was polymerized by heating at reflux (ca 94.5° C.) until the viscosity moved from "I+" (ca 2.3 poises) to "W—" (ca 10 poises). At this point the batch was cooled to room temperature and filtered.

(b) *Coating of paper*

To the condensate thus obtained, 1% of a polyethylene oxide derivative of an octyl phenol containing an average of ten oxyethylene units and 3% of p-toluenesulfonic acid was added. The resulting composition was applied to several sections of chipboard carrying a china clay-casein coating on one face as by roller applications to the coated face and doctored by a wire-wound rod. The several sections were cured at 250° F. one for 40 seconds, another for 50 seconds, and a third for one minute. The several sections were resistant to heat-sealing up to temperatures of 210° F., 210° F., and 240° F. respectively. The coatings had a high gloss and were clear, moisture-resistant, and grease-resistant.

EXAMPLE 3

(a) *Preparation of condensate*

Diethylene glycol dicarbamate (115.2 grams or 0.6 mole) was charged to a 300 ml. flask containing 126.0 g. of aqueous 35.7% formaldehyde (1.5 moles HCHO) and heat and stirring were applied. At 50° C. the batch was acidified to pH=3.4 (G.E.) with 1.0 ml. of 25% aqueous H₂SO₄ and heating was continued to reflux. The reaction mixture was polymerized by heating at reflux for 10 hours until the Gardner-Holdt viscosity rose to "G" (1.65 poises). At this point heating was stopped and the reaction mixture neutralized with 0.6 ml. of 50% aqueous NaOH solution to a pH of about 7. The batch was filtered and found to possess the following constants:

Viscosity (25° C.): "H" (Gardner-Holdt)=2.0 poises
Solids: 60.5%
pH (G.E.): 7.2
Water tolerance: Infinite
Color (Paint and Varnish Colorimeter): Less than 1 (Substantially colorless)

(b) To the resulting condensate 1.37% sulfuric acid was added and the coating composition thus obtained was applied to printed labels and printed cover stock for paper-covered pocket-sized books. There was no reluctance to wet the hydrophobic inks and no tendency to smudge. The coated papers were cured at 250° F. for one minute. Clear, non-tacky, mar-resistant coatings were obtained.

EXAMPLE 4

The condensate of Example 1 (a) was mixed with 5% of the hydrochloride of 2-methyl-2-amino-1-propanol and the mixture was diluted with water to a resin solids concentration of 5%. The dispersion thus obtained was sprayed on a glassine paper and dried by a rapid passage (3 seconds) through an oven at 90° C. An organosol comprising 25 parts of a copolymer of 85% vinyl chloride and 15% vinyl acetate and 8 parts of tricresyl phosphate in 67 parts of dioxane was roller coated on the coated face of the paper to form a vinyl resin film thereon 0.0002 inch in thickness, dried at 75° C., and then stripped from the paper backing. Excellent release was obtained and there was no migration of tricresyl phosphate to the carbamate-condensate coating on the paper backing, enabling the latter to be used repeatedly for the formation of the vinyl resin film.

EXAMPLE 5

The condensate of Example 2 (a) was mixed with 5% of ethanesulfonic acid and 1% of ultramarine blue and roller-coated on an uncoated chipboard. A glossy, blue coated chipboard was obtained after drying and curing for 40 seconds at 240° F.

It is to be understood that changes and variations may be made without departing from the spirit and scope of the invention as defined in the appended claims.

We claim:

1. A method for producing a coated paper product having high gloss comprising applying to the paper an aqueous dispersion containing a water-soluble high molecular weight condensate of a mixture comprising the dicarbamate of diethylene glycol and formaldehyde, in which the molar ratio of formaldehyde to the dicarbamate is from 2:1 to 3.5:1, said condensate having a viscosity, at a concentration of 60% in water at 25° C., of 2 to 25 poises, drying, and curing the coating to a water-insoluble condition.

2. A method for producing a coated paper product having high gloss comprising applying to the paper an aqueous dispersion containing a water-soluble high molecular weight condensate of a mixture comprising the dicarbamate of diethylene glycol and formaldehyde, in which the molar ratio of formaldehyde to the dicarbamate is from 2.5:1 to 3:1, said condensate having a viscosity, at a concentration of 60% in water at 25° C., of 2 to 25 poises, drying, and curing the coated paper at a temperature from room temperature to 250° F.

3. A method for producing a coated paper product having high gloss comprising applying to the paper an aqueous dispersion containing a water-soluble high molecular weight condensate of a mixture comprising the dicarbamate of diethylene glycol and formaldehyde, in which the molar ratio of formaldehyde to the dicarbamate is from 2:1 to 3.5:1, said condensate having a viscosity, at a concentration of 60% in water at 25° C., of 2 to 25 poises, said composition containing 1 to 3% by weight of an acid catalyst based on the weight of condensate, and subsequently curing the coated paper at a temperature of about 250° F.

4. A method for producing a coated paper product having high gloss comprising applying to the paper an aqueous dispersion containing 5% to 70% of a water-soluble high molecular weight condensate of a mixture comprising the dicarbamate of diethylene glycol and formaldehyde, in which the molar ratio of formaldehyde to dicarbamate is from 2:1 to 3.5:1, said condensate having a viscosity, at a concentration of 60% in water at 25° C., of 6 to 20 poises, drying, and curing the coated paper at a temperature from room temperature to 250° F.

5. A method for producing a coated paper product having high gloss comprising applying to the paper an aqueous dispersion containing a water-soluble film-forming, high-molecular weight condensate of a mixture comprising the dicarbamate of diethylene glycol, formaldehyde, and methanol, in which the molar ratio of formaldehyde to dicarbamate is from 2:1 to 3.5:1 and that of methanol to the dicarbamate is 1:1 to 2.5:1, said condensate having a viscosity, at a concentration of 60% in water at 25° C., of 2 to 25 poises, drying, and curing the coated paper at a temperature from room temperature to 250° F.

6. A method for producing a coated paper product having high gloss comprising applying to the paper an aqueous alcoholic dispersion containing 5% to 70% of a water-soluble film-forming, high molecular weight condensate of a mixture comprising the dicarbamate of diethylene glycol, formaldehyde, and methanol in which the molar ratio of formaldehyde to dicarbamate is from 2.5:1 to 3:1 and that of methanol to the dicarbamate is 1.5:1 to 2:1, said condensate having a viscosity, at a concentration of 60% in water at 25° C., of 2 to 25 poises, drying, and curing the coated paper at a temperature from room temperature to 250° F.

7. As an article of manufacture, a paper product comprising a paper base carrying thereon a coating comprising a water-insoluble high molecular weight condensate of a mixture comprising the dicarbamate of diethylene glycol and formaldehyde, in which the molar ratio of formaldehyde to the dicarbamate is from 2:1 to 3.5:1.

8. As an article of manufacture, a paper product comprising a paper base carrying thereon a coating comprising a water-insoluble high molecular weight condensate of a mixture comprising the dicarbamate of diethylene glycol and formaldehyde, in which the molar ratio of formaldehyde to the dicarbamate is from 2.5:1 to 3:1.

9. As an article of manufacture, a paper product comprising a paper base carrying thereon a coating comprising a water-insoluble high molecular weight condensate of a mixture comprising the dicarbamate of diethylene glycol and formaldehyde in which the molar ratio of formaldehyde to the dicarbamate is from 2:1 to 3.5:1, said coating being plasticized by a monoalkyl ether of ethylene glycol in which the alkyl group contains 1 to 4 carbon atoms.

10. As an article of manufacture, a paper product comprising a paper base carrying thereon a coating comprising a water-insoluble high molecular weight condensate of a mixture comprising the dicarbamate of diethylene glycol and formaldehyde, in which the molar ratio of formaldehyde to dicarbamate is from 2:1 to 3.5:1, said coating containing a coloring material.

11. As an article of manufacture, a paper product comprising a paper base carrying thereon a coating comprising a water-insoluble high molecular weight condensate of a mixture comprising the dicarbamate of diethylene glycol, formaldehyde, and methanol in which the molar ratio of formaldehyde to dicarbamate is from 2:1 to 3.5:1 and that of methanol to the dicarbamate is 1:1 to 2.5:1.

12. As an article of manufacture, a paper product comprising a printed paper base carrying thereon a coating comprising a water-insoluble high molecular weight condensate of a mixture comprising the dicarbamate of diethylene glycol, formaldehyde, and methanol in which the molar ratio of formaldehyde to dicarbamate is from 2:1 to 3.5:1 and that of methanol to the dicarbamate is 1:1 to 2.5:1.

13. As an article of manufacture, a paper product comprising a paper base carrying thereon a coating comprising a water-insoluble high molecular weight condensate of a mixture comprising the dicarbamate of diethylene glycol, formaldehyde, and methanol in which the molar ratio of formaldehyde to dicarbamate is from 2.5:1 to 3:1 and that of methanol to the dicarbamate is 1.5:1 to 2:1.

References Cited in the file of this patent

UNITED STATES PATENTS

| | | |
|---|---|---|
| 2,582,730 | Wohersiedler | Jan. 15, 1952 |

FOREIGN PATENTS

| | | |
|---|---|---|
| 491,449 | Great Britain | of 1938 |
| 695,636 | Germany | of 1940 |
| 890,878 | France | of 1944 |